(12) United States Patent
Mueck

(10) Patent No.: US 8,855,709 B2
(45) Date of Patent: Oct. 7, 2014

(54) COMMUNICATION DEVICES AND METHODS FOR SELECTING A RADIO ACCESS MODE

(75) Inventor: Markus Dominik Mueck, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 104 days.

(21) Appl. No.: 13/463,854

(22) Filed: May 4, 2012

(65) Prior Publication Data

US 2013/0295986 A1  Nov. 7, 2013

(51) Int. Cl.
*H04M 1/00* (2006.01)

(52) U.S. Cl.
USPC ..... 455/552.1; 455/436; 455/574; 455/343.2; 455/127.5

(58) Field of Classification Search
USPC ............... 455/552.1, 574, 343.2, 127.5, 436
See application file for complete search history.

(56) References Cited

U.S. PATENT DOCUMENTS

| | | | |
|---|---|---|---|
| 2004/0043798 A1* | 3/2004 | Amerga et al. | 455/574 |
| 2007/0129045 A1* | 6/2007 | Aerrabotu | 455/343.5 |
| 2009/0068969 A1* | 3/2009 | Lindoff et al. | 455/161.1 |
| 2010/0248646 A1* | 9/2010 | Yamazaki et al. | 455/73 |
| 2013/0065525 A1* | 3/2013 | Kiukkonen et al. | 455/41.2 |
| 2013/0065596 A1* | 3/2013 | Frederiksen et al. | 455/436 |
| 2013/0223235 A1* | 8/2013 | Hu et al. | 370/242 |

OTHER PUBLICATIONS

ETSI TR 102 680; V1.1.1; Reconfigurable Radio Systems (RRS); SDR Reference Architecture for Mobile Device, Mar. 2009, pp. 1-23.

\* cited by examiner

*Primary Examiner* — Sanh Phu
(74) *Attorney, Agent, or Firm* — Schwabe, Williamson & Wyatt, P.C.

(57) ABSTRACT

According to one aspect of this disclosure, a communication device is provided comprising a determiner configured to determine, for each of a plurality of radio access modes, an expected power consumption required for communicating using the radio access mode; and a controller configured to select a radio access mode from the plurality of radio access modes to be used for communication based on the determined expected power consumptions.

35 Claims, 11 Drawing Sheets

COMMUNICATION DEVICES AND METHODS FOR SELECTING A RADIO ACCESS MODE

TECHNICAL FIELD

The present disclosure relates to communication devices and methods for selecting a radio access mode.

BACKGROUND

Modern communication devices such as mobile communication terminals (e.g. cell phones) may be capable of communicating using a plurality of radio access technologies. Since the selected radio access technology for communication typically has impact on multiple factors such as communication costs, communication quality, power consumption etc. and the usage of some radio access technologies may thus be desired by a user or network operator over others, efficient and flexible approaches for radio access network selection are desirable.

SUMMARY

According to one aspect of this disclosure, a communication device is provided including a determiner configured to determine, for each of a plurality of radio access modes, an expected power consumption required for communicating using the radio access mode and a controller configured to select a radio access mode from the plurality of radio access modes as a candidate radio access mode to be used for communication based on the determined expected power consumptions.

According to another aspect of this disclosure, a communication device is provided including a communication circuit configured to communicate using a radio access technology; a detector configured to detect whether a predetermined waiting time has elapsed since the time of a switch between communicating using the radio access technology and not communicating using the radio access technology and a controller configured to control the communication circuit to switch between communicating using the radio access technology and not communicating using the radio access technology depending on whether it has been determined that the predetermined waiting time has elapsed since the time of the switch between communicating using the radio access technology and not communicating using the radio access technology.

According to other aspects of this disclosure, a method for selecting a radio access mode and a method for selecting a radio access technology according to the communication devices described above are provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. These aspects of this disclosure are described in sufficient detail to enable those skilled in the art to practice the invention. Other aspects of this disclosure may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
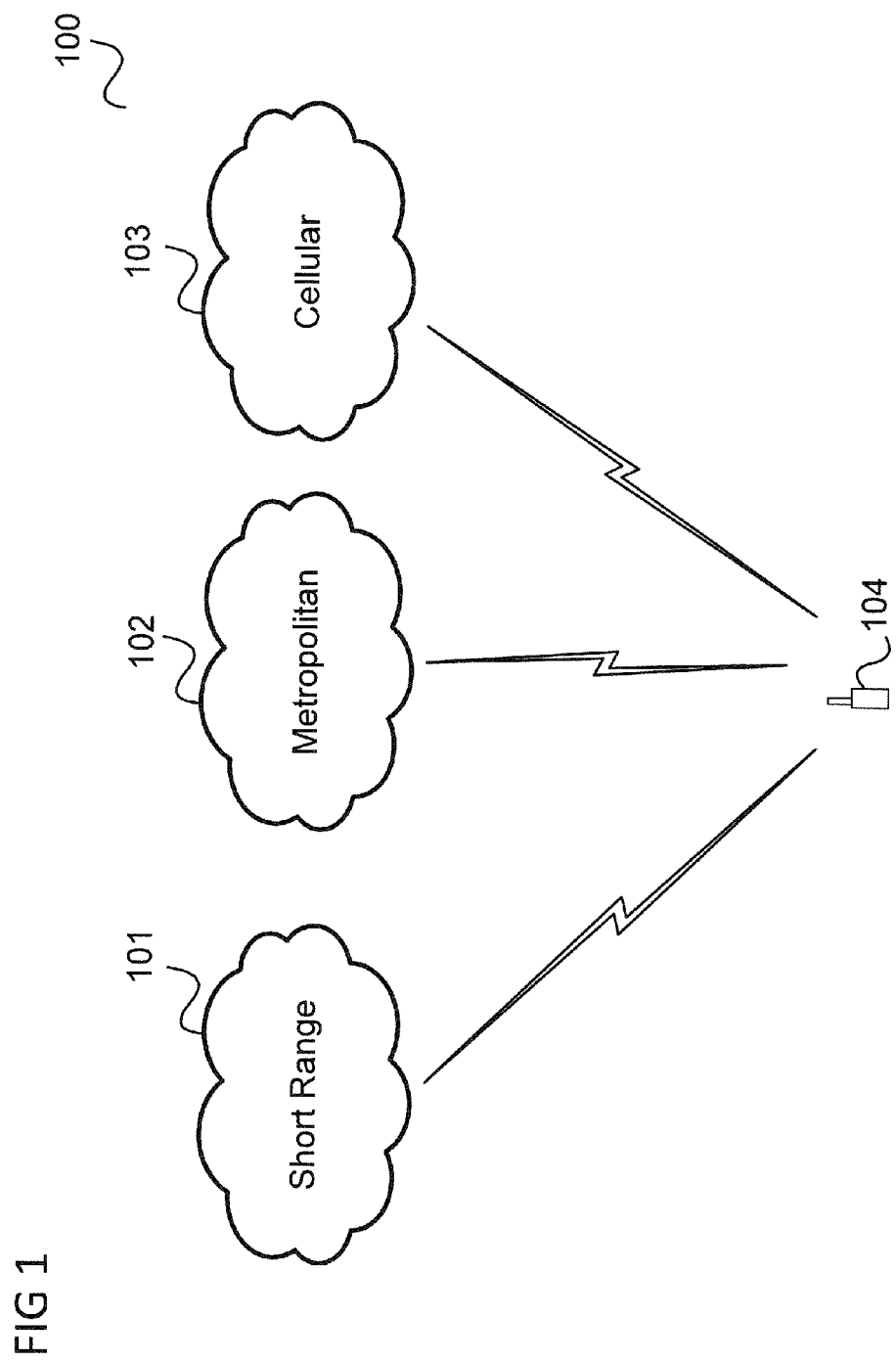
FIG. 1 shows a communication arrangement.

FIG. 1 shows a communication arrangement 100.

The communication arrangement 100 illustrates a heterogeneous wireless environment including a plurality of mobile communication networks 101, 102, 103 which may include communication systems such as 2G, 3G, LTE, LTE-Advanced, WiFi (IEEE 802.11a/b//g/n/ac), WiFi for television white spaces (IEEE 802.11af), WiMAX, etc. Specifically, in this example, the communication arrangement 100 includes a short range communication network 101, a metropolitan area communication network 102 and a cellular (wide area communication network) 103.

The short range communication network 101 may operate according to a short range radio communication technology (which may include e.g. a Bluetooth radio communication technology, an Ultra Wide Band (UWB) radio communication technology, and/or a Wireless Local Area Network radio communication technology (e.g. according to an IEEE 802.11 (e.g. IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11ac/ad.

The metropolitan area communication network 102 may operate according to a metropolitan area system radio communication technology (which may include e.g. a Worldwide Interoperability for Microwave Access (WiMax) (e.g. according to an IEEE 802.16 radio communication standard, e.g. WiMax fixed or WiMax mobile), WiPro, HiperMAN (High Performance Radio Metropolitan Area Network) and/or IEEE 802.16m Advanced Air Interface.

The cellular communication network 103 may operated according to a cellular wide area radio communication technology (which may include e.g. a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (e.g. UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handy-phone System), WiDEN (Wideband Integrated Digital Enhanced Network), iBurst, Unlicensed Mobile Access (UMA, also referred to as also referred to as 3GPP Generic Access Network, or GAN standard)).

Short Range radio communication technologies may include the following Short Range radio communication technology sub-families:

personal area networks (Wireless PANs) radio communication sub-family, which may include e.g. IrDA (Infrared Data Association), Bluetooth, UWB, Z-Wave and ZigBee; and wireless local area networks (W-LANs) radio communication sub-family, which may include e.g. HiperLAN/2 (HIgh PErformance Radio LAN; an alternative ATM-like 5 GHz standardized technology), IEEE 802.11a (5 GHz), IEEE 802.11g (2.4 GHz), IEEE 802.11n, IEEE 802.11 ac/ad.

Metropolitan Area System radio communication technology families may include the following Metropolitan Area System radio communication technology sub-families:

a Wireless campus area networks (W-CANs) radio communication sub-family, which may be considered one form of a metropolitan area network, specific to an academic setting, and which may include e.g. WiMAX, WiPro, HiperMAN (High Performance Radio Metropolitan Area Network), or IEEE 802.16m Advanced Air Interface; and a Wireless metropolitan area networks (W-MANs) radio communication sub-family, which may be limited to a room, building, campus or specific metropolitan area (e.g., a city) respectively, and which may include e.g. WiMAX, WiPro, HiperMAN (High Performance Radio Metropolitan Area Network), or IEEE 802.16m Advanced Air Interface.

Cellular Wide Area radio communication technologies may also be considered as Wireless Wide Area Network (Wireless WAN) radio communication technologies.

A mobile communication device 104 (e.g. a mobile terminal such as a subscriber terminal) may be able to maintain one or multiple links to each of the communication networks 101, 102, 103 (e.g. via one or more base stations or one or more access points of the communication networks 101, 102, 103) and may thus be provided access to the communication networks 101, 102, 103 and to other networks such as core networks of the communication networks 101, 102, 103 or the Internet. The communication technologies used by the communication networks 101, 102, 103 can thus be used as radio access technologies (RATs) by the mobile communication device 104.

Figure 2:
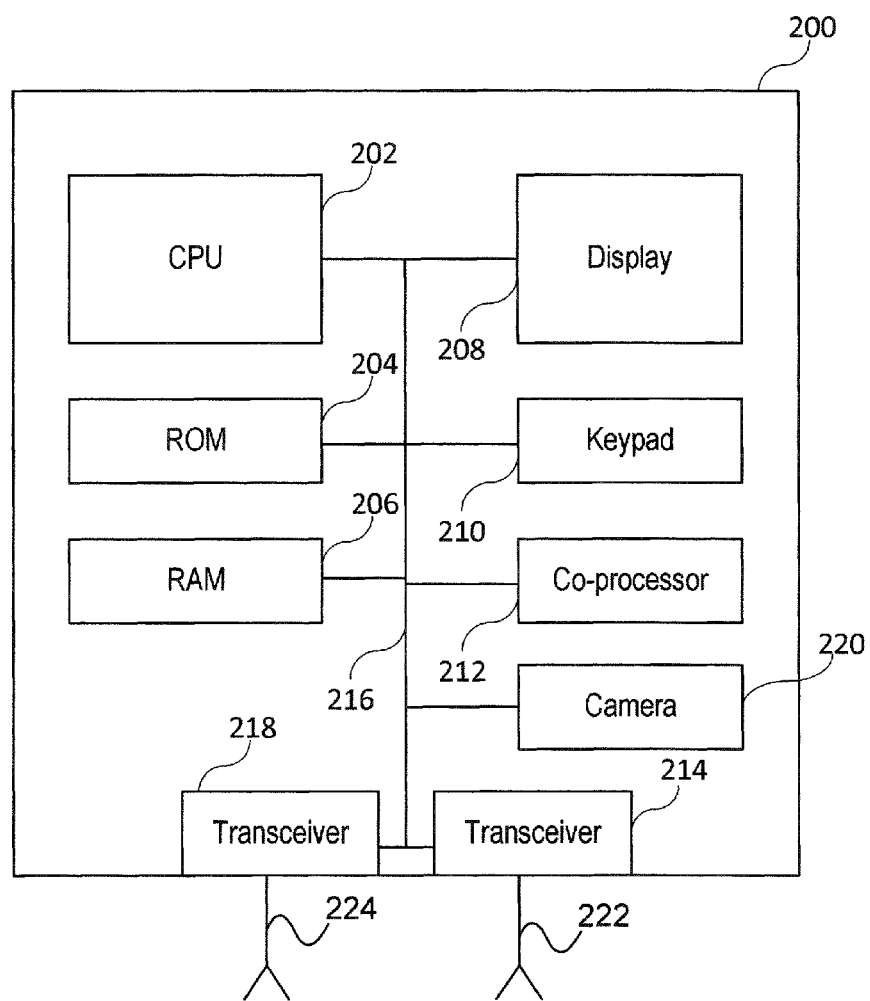
FIG. 2 shows an exemplary communication device.

An example for a structure of the mobile communication device 104 is given in FIG. 2.

FIG. 2 shows a communication device 200, e.g. corresponding to the mobile communication device 201.

The communication device 200 may include a processor 202, such as e.g. a microprocessor (e.g. a central processing unit (CPU)) or any other type of programmable logic device (which may for example act as controller). Furthermore, the communication device 200 may include a first memory 204, e.g. a read only memory (ROM) 204 and/or a second memory 206, e.g. a random access memory (RAM) 206. Moreover, the communication device 200 may include a display 208 such as e.g. a touch sensitive display, e.g. a liquid crystal display (LCD) display or a light emitting diode (LED) display, or an organic light emitting diode (OLED) display. However, any other type of display may be provided as the display 208. The communication device 200 may in addition include any other suitable output device (not shown) such as e.g. a loudspeaker or a vibration actuator. The communication device 200 may include one or more input devices such as keypad 210 including a plurality of keys. The communication device 200 may in addition include any other suitable input device (not shown) such as e.g. a microphone, e.g. for speech control of the communication device 200. In case the display 208 is implemented as a touch sensitive display 208, the keypad 210 may be implemented by the touch sensitive display 208. Moreover, optionally, the communication device 200 may include a co-processor 212 to take processing load from the processor 202. Furthermore, the communication device 200 may include a plurality of transceivers 214, 218 which may be part of a communication circuit and which may allow the communication device 200 to use various radio access technologies for communicating. The above described components may be coupled with each other via one or more lines, e.g. implemented as a bus 216. The first memory 204 and/or the second memory 206 may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory) or a CBRAM (Conductive Bridging Random Access Memory). The program code used to be executed and thereby to control the processor 202 (and optionally the co-processor 212) may be stored in the first memory 204. Data (e.g. the messages received or to be transmitted via the first transceiver 214) to be processed by the processor 202 (and optionally the co-processor 212) may be stored in the second memory 206.

One or more of the transceivers 214, 218 may for example be configured such that it implements a Uu interface in accordance with LTE or an air interface in accordance with another other radio communication technology.

Each transceiver 214, 218 is coupled with one or more respective antennas 222, 224 used by the transceiver 214, 218 to transmit and receive radio signals. The communication device 200 and one or more of the transceivers 214, 218 may also be configured to provide MIMO radio transmission.

For example, one of the transceivers 214, 218 supports a cellular wide area radio access technology while the other transceiver 214, 218 supports a different radio communication technology e.g. a Wireless Local Area Network (WLAN) technology, e.g. a Personal Area Network (PAN) technology or any other desired wireless communication technology. Thus, the communication device 200 may support usage of a plurality of different radio access technologies simultaneously.

Moreover, the communication device 200 may include a still image and/or video camera 220, configured to provide a video conference via the communication device 200.

Furthermore, the communication device 200 may include a Subscriber Identity Module (SIM), e.g. a UMTS Subscriber Identity Module (USIM) identifying a user and subscriber 216 of the communication device 200 e.g. for usage of a cellular wide area communication network 103.

The processor 202 may include audio processing circuits such as e.g. an audio decoding circuit and/or audio encoding circuit, configured to decode and/or encode audio signals in accordance with one or more of the following audio encoding/decoding technologies: ITU G.711, Adaptive Multi-Rate Narrowband (AMR-NB), Adaptive Multi-Rate Wideband (AMR-WB), Advanced Multi-Band Excitation (AMBE), etc.

Figure 3:
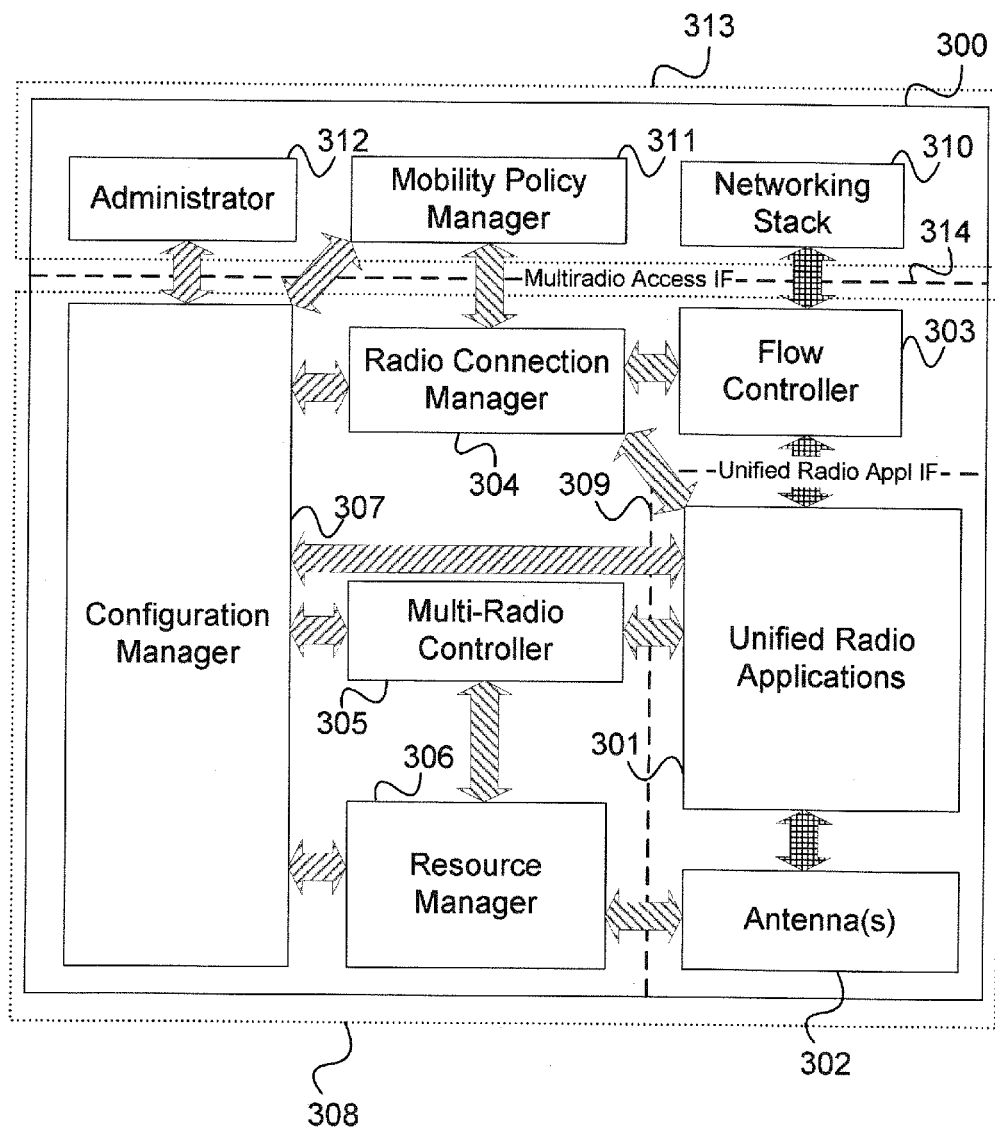
FIG. 3 shows an communication device illustrating the handset manufacturer domain and the chipset manufacturer domain.

A possible architecture regarding the functional components related to radio communication of the communication device 200 is illustrated in FIG. 3.

FIG. 3 shows a communication device 300 illustrating the handset manufacturer domain and the chipset manufacturer domain.

The communication device 300 includes unified radio applications block 301. This may correspond to the transceivers 214, 218 and may for example provide the physical layer of the supported radio access technologies. The unified radio applications block 301 may be implemented by hardware components and/or software components, e.g. by one or more circuits. For example, the communication device 200, 300 may include a communication processor (e.g. a communication chip, possibly optimized for radio communication) executing software and thus implementing the unified radio applications (and the transceivers 214, 218). This communication processor may be reconfigurable to implement various radio access technologies. It may thus implement software defined radio (SDR). The unified radio applications may also be implemented by other reconfigurable elements like reconfigurable processing cores.

The unified radio applications block 301 is coupled to one or more antennas 302 corresponding to the antennas 222, 224.

The communication device further includes a flow controller 303, a radio connection manager 304, a multi-radio controller 305, a resource manager 306 and a configuration manager 307. These components, together with the unified radio applications block 301 and the one or more antennas 302 can be seen to be part of the chipset manufacturer domain of the communication device 300. This means that these components are provided and configured by the manufacturer of the chipset of the communication device. The chipset for example includes the communication processor (or the reconfigurable elements) implementing the unified radio applications 301. The flow controller 303, the radio connection manager 304, the multi-radio controller 305, the resource manager 306 and the configuration manager 307 can be seen as control blocks and may be implemented by hardware components of the chipset (possibly also involving the execution of software, e.g. on the communication processor) but may also at least partially be implemented by software running on the processor 202, which is for example an application processor of the communication device 200, 300.

The communication device 300 further includes a networking stack 310 (implementing the network layer), a mobility policy manager 311 and an administrator block 312. These components may all be implemented by the processor 202 executing corresponding software. They can be seen to be part of the handset manufacturer domain 313, i.e. are for example provided and configured by the handset (i.e. communication device) manufacturer.

The radio communication manager 304 may decide according to which radio access technology one or more communication connections are established and thus which radio access technology is used by the communication device 300 for communicating. This may be based on policies provided by the mobility policy manager 310, 311, 312 as described in more detail below.

The multi radio controller 305 may decide how the resources of the communication device are allocated to the communication connection which should be established and used according to the decision of the radio communication manager 304 (e.g. how many reconfigurable processing cores are allocated for a certain communication connection).

The resource manager 306 may control the frequency spectrum used by the communication connections to be established and used according to the decision of the radio communication manager 304.

The flow controller 303 may serve to abstract the radio communication technology used and provide a data pipe to the network layer.

The configuration manager 307 for example controls the communication between the control blocks 303, 304, 305, 306, 307.

The handset manufacturer domain 313 and the chipset manufacturer domain 308 are coupled via a multiradio access interface 314.

The handset manufacturer domain 313 and the chipset manufacturer domain 308 can for example be differentiated by the fact that the handset manufacturer domain 313 is limited to software executed on an application processor (e.g. the processor 202) is controlling the operation of the RAT hardware (e.g. the communication processor implementing the unified radio applications) through a high-level interface, namely the multiradio access interface 314. The chipset manufacturer domain 308 on the other hand may be understood to contain all hardware and software related to the operation of a specific RAT (or multiple RATs), including the physical layer (base-band and RF), the MAC (medium access control) layer, etc. The handset manufacturer domain 313 may thus be seen to correspond to the application processor (e.g. implementing entities of the network layer and above) and the chipset manufacturer domain may be seen to correspond to a communication circuit (e.g. implementing the physical layer and at least the MAC layer of the data link layer).

According to one aspect of this disclosure, an approach to select a suitable mobile device configuration, i.e. to select which RAT(s) are selected to be operated (simultaneously) by the communication device 200, 300 is provided. For this, for example, at least one of the following two key parameters is taken into account:
   Overall power consumption (including e.g. modem power consumption) required for ensuring a target connection performance, e.g. a target QoS (Quality of Service),
   Communication costs (i.e. communication fees, e.g. subscription costs) for selected RATs.

According to one aspect of this disclosure the RAT selection problem is specifically addressed in the context of the reconfigurable radio architecture introduced in the ETSI RRS (Reconfigurable Radio Systems) standards body and as illustrated in FIG. 3. This means that the handset manufacturer domain 313 may control communication costs and overall RAT selection policies while the chipset manufacturer domain (i.e. the chipset) may itself control radio parameters and executes device reconfiguration based on handset manufacturers' policies.

The RAT selection approach may be based on a shared optimization between the handset manufacturer domain 313 and the chipset manufacturer domain 308. The handset manufacturer domain 313 may offer high-level preferences to the chipset manufacturer domain 308 via a standardized interface (e.g. the multiradio access interface 314) such that the final RAT selection can be done in the chipset manufacturer domain 308, exploiting for example in particular an energy efficiency focused parameter set given by a pre-determined (Joules/Bit/RAT) table. Also, via this standardized interface further base-band internal parameters may be given to the handset manufacturer domain in order to exploit for example energy efficiency parameters for alternative optimized decision making processes.

It should be noted that that energy efficiency aspects may be taken into account by selecting the RAT which has the strongest reception signal in a communication device. However, this approach can lead to a largely suboptimum selection depending on the efficiency of a specific RAT implementation, depending on the network load (e.g., a lot of energy may be spent for obtaining a low throughput if a small number of resource blocks are attributed to a specific user). According to one aspect of this disclosure, those implementation and operation specific particularities are taken into account.

More specifically, in the chipset manufacturer domain 313, communication performance indicators (in the following referred to as KPIs for key performance indicators) such as signal-to-noise ratio (SNR), received signal strength indicator (RSSI), packet error rate (PER) for one or more supported RATs, e.g. based on the current radio conditions, may be derived, e.g. through sensing etc. and an expected power consumption is derived for communicating using these RATs is derived as will be described in more detail further below. The KPIs and/or the expected power consumptions may be communicated over the multiradio access interface 315 to the handset manufacturer domain 313.

The KPIs, which may be seen to specify the radio condition for a RAT, may include signal-to-noise ratio (SNR), signal-to-interference-plus-noise ratio (SINR), interference levels (in particular of neighbouring cells, etc.), received signal strength indicator (RSSI), packet error rate (PER), bit error rate (BER), round-trip-delay time, latency parameters, jitter parameters, packet retransmission levels (typically related to HARQ mechanisms), Cyclic Redundancy Check (CRC) error levels, synchronization miss-detection/false-alarm probabilities, level of communication interruptions (e.g., loss of connection through missed handovers), level of horizontal/vertical handovers, availability of spectrum (in particular important for dynamic spectrum allocation strategies) in given geographical areas in a given time, mobility of the user, change characteristics of the environment, Doppler parameters, multipath propagation characteristics, throughput variation (e.g., are there frequent drops of data throughput, etc.), number of users for a given RAT (i.e., level of congestion of a given link), suitability of the modem hardware for a given RAT, suitability of the modem hardware for a given service (may depend on the type of service from a website, e.g. is it video streaming, static text, etc.), coverage area for one or more supported RATs. Those parameters can be acquired by various means, e.g. a Mobile Device can measure those data, the data can be obtained from the network (e.g. via a Cognitive Pilot Channel, etc.), the data can be obtained by neighbouring devices via Device-to-Device communication, etc.

The handset manufacturer domain 313 (e.g. the mobility policy manager) may derive one or more RAT selection policies (possibly based on the information received from the chipset manufacturer domain 308) and may provide them to the chipset manufacturer domain 308 over the multiradio access interface 315. The RAT selection policies may be constantly updated taking for example RAT usage costs and current power (energy) consumption of the various RATs into account.

The chipset manufacturer domain 308 (e.g. the radio communication manager 304) may receive these one or more RAT selection policies and execute RAT selection accordingly.

Figure 4:
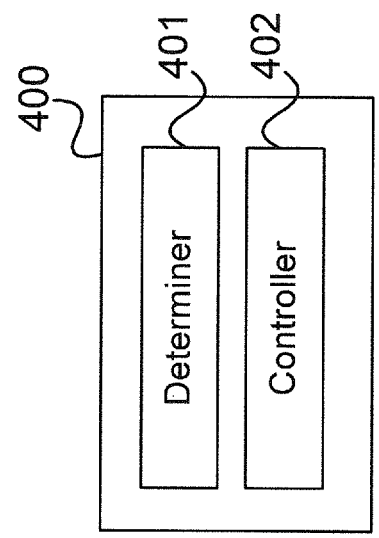
FIG. 4 shows a communication device including components for selecting a radio access mode.

Generally, according to one aspect of this disclosure, a communication device as illustrated in FIG. 4 is provided.

FIG. 4 shows a communication device 400 including components for selecting a radio access mode.

The communication device 400 includes a determiner 401 configured to determine, for each of a plurality of radio access modes, an expected power consumption required for communicating using the radio access mode.

The communication device 400 further includes a controller 402 configured to select a radio access mode from the plurality of radio access modes as candidate radio access mode to be used for communication based on the determined expected power consumptions.

According to one aspect of this disclosure, in other words, radio access mode (e.g. RAT or RAT combination selection) is carried out based on an energy consumption criterion, wherein the energy consumption of each of a plurality of radio access modes may be derived from a system state (in terms of radio conditions using the various radio access modes) which is for example determined based on measurements carried out by the communication device.

It should be noted that the final selection of a radio access mode may take into account that some RATs are highly reliable over a large coverage area but data-rate is low (e.g. GSM), while other RATs are reliable only within a small geographical area but they may provide higher data rates (e.g., WLAN IEEE 802.11n/ac/etc.). A suitable mixture of mid-rate/high-robustness and high-rate/mid-robustness RATs may be selected in case that multiple RATs are operated simultaneously. This may for example be important if the user is moving. Each radio access mode for example corresponds to a radio access technology or a combination of radio access technologies and using the radio access mode for communication is for example using the radio access technology or the combination of radio access technologies (e.g. a set or plurality of radio access technologies) for communication.

The determiner may be further configured to determine, for each of the plurality of radio access modes, a radio condition for communicating using the radio access mode (e.g. in terms of one or more KPIs for a RAT used according to the radio access mode) and is for example configured to determine the expected power consumption for the radio access mode based on the radio condition determined for the radio access mode.

For example, the radio condition for a radio access mode is the load of a communication network that would be used for the radio access mode (i.e. that provides radio access using the radio access mode) or a reception quality of one or more signals received using the radio access mode (e.g. from a network using the radio access mode).

The controller may be further configured to control the communication device to communicate using the selected candidate radio access mode.

The controller may be further configured to select the candidate radio access mode further based on a data rate desired for the communication.

For example, the controller is configured to select the candidate radio access mode further based on a RAT selection policy. The policy may for example be set by an operator of a home network of the communication device and may for example be received by the communication device from the home network.

The controller may be configured to generate a ranking of the radio access modes based on the determined expected power consumptions and may be configured to select a radio access mode to be used for communication based on the generated ranking of radio access modes.

According to one aspect of this disclosure, the controller is configured to receive a preference list specifying a ranking of the plurality of radio access technologies and is configured to select the candidate radio access mode to be used for communication based on the ranking.

The controller may be configured to generate a first ranking of the radio access modes based on the determined expected power consumptions and may be configured to receive a preference list specifying a second ranking of the plurality of radio access modes and may be configured to select a radio access mode to be used for communication based on a combination of the first ranking of radio access modes and the second ranking of radio access modes.

For example, the preference list further specifies for each radio access mode of the plurality of radio access technologies a maximum allowed power consumption and the controller is configured to select the candidate radio access mode depending on whether the power consumption estimated for the radio access mode is within the maximum allowed power consumption.

The controller may for example be configured to select a radio access mode as candidate radio access mode only if the power consumption estimated for the radio access mode is within the allowed power consumption.

The controller is for example part of the chipset manufacturer domain of the communication device and is for example configured to receive the preference list from a component of the handset manufacturer domain of the communication device (e.g. via an interface between the handset manufacturer domain and the chipset manufacturer domain such as the multiradio access interface according to ETSI (European Telecommunications Standards Institute).

The communication device may for example further include a policy manager as the component of the handset manufacturer domain of the communication device, wherein the policy manager is configured to generate the preference list.

Figure 5:
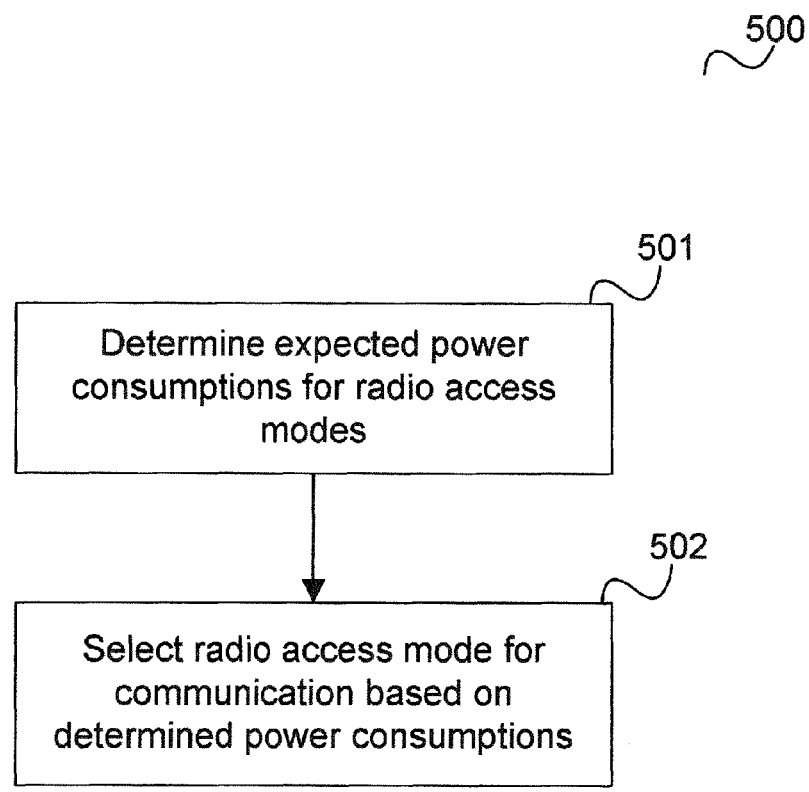
FIG. 5 shows a flow diagram illustrating a method for selecting a radio access mode.

The communication device 400 for example carries out a method as illustrated in FIG. 5.

FIG. 5 shows a flow diagram 500 illustrating a method for selecting a radio access mode.

The flow diagram 500 illustrates a method for selecting a radio access mode.

In 501, for each of a plurality of radio access modes, an expected power consumption required for communicating using the radio access mode is determined.

In 502, a radio access mode from the plurality of radio access technologies is selected as candidate radio access mode to be used for communication based on the determined expected power consumptions.

Examples for the communication device 400 and the method illustrated by the flow diagram 500 are described in the following in more detail.

According to one aspect of this disclosure, a link selection policy generator (LSPG) is introduced in the handset manufacturer domain 313 of the architecture described with reference to FIG. 3. The link selection policy generator may be implemented by the mobility policy manager 311.

Correspondingly, according to one aspect of this disclosure, an energy consumption estimator (ECE) may be introduced in the chipset manufacturer domain which may be implemented by the mobile radio controller 305 but may also involve other components of the chipset manufacturer domain 308.

Figure 6:
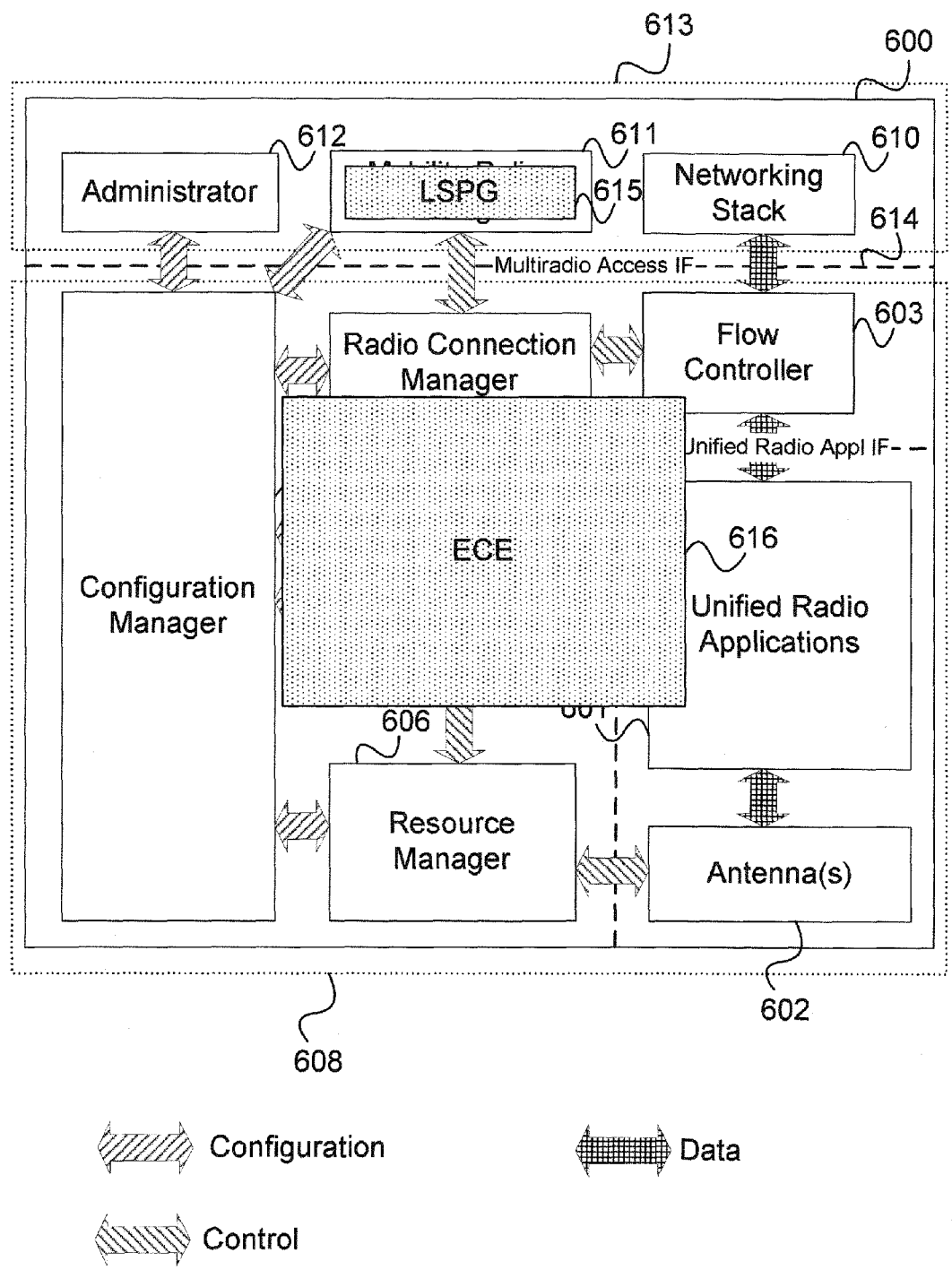
FIG. 6 shows a communication device including components for selecting a radio access technology or combination of radio access technologies.

This is illustrated in FIG. 6.

FIG. 6 shows a communication device 600 including components for selecting a radio access technology or combination of radio access technologies.

The communication device 600 corresponds to the communication device 300 and includes, as described with reference to FIG. 3, a chipset manufacturer domain 608 including a unified radio applications block 601, one or more antennas 602, a flow controller 603, a radio connection manager 604, a multi-radio controller 605, a resource manager 606 and a configuration manager 607 and a handset manufacturer domain 613 including a networking stack 610, a mobility policy manager 611 and an administrator block 612. The handset manufacturer domain 614 and the chipset manufacturer domain 608 are coupled by a multi radio access interface 614.

An LSPG 615 is shown over the mobility policy manager 611 to illustrate that it may be implemented by the mobility policy manager 611. For example, it provides the functionality of the mobility policy manager 611 to generate a RAT preference list (in other words a RAT selection policy).

An ECE 616 is shown over various other components of the chipset manufacturer domain 608 to illustrate that it may be implemented by various components of the chipset manufacturer domain 608.

The LSPG 615 and the ECE 616 may interact via the multiradio access interface 614.

The processing for policy generation and RAT (or in other words radio link) selection according to one aspect of this disclosure is described in the following with reference to FIG. 7.

Figure 7:
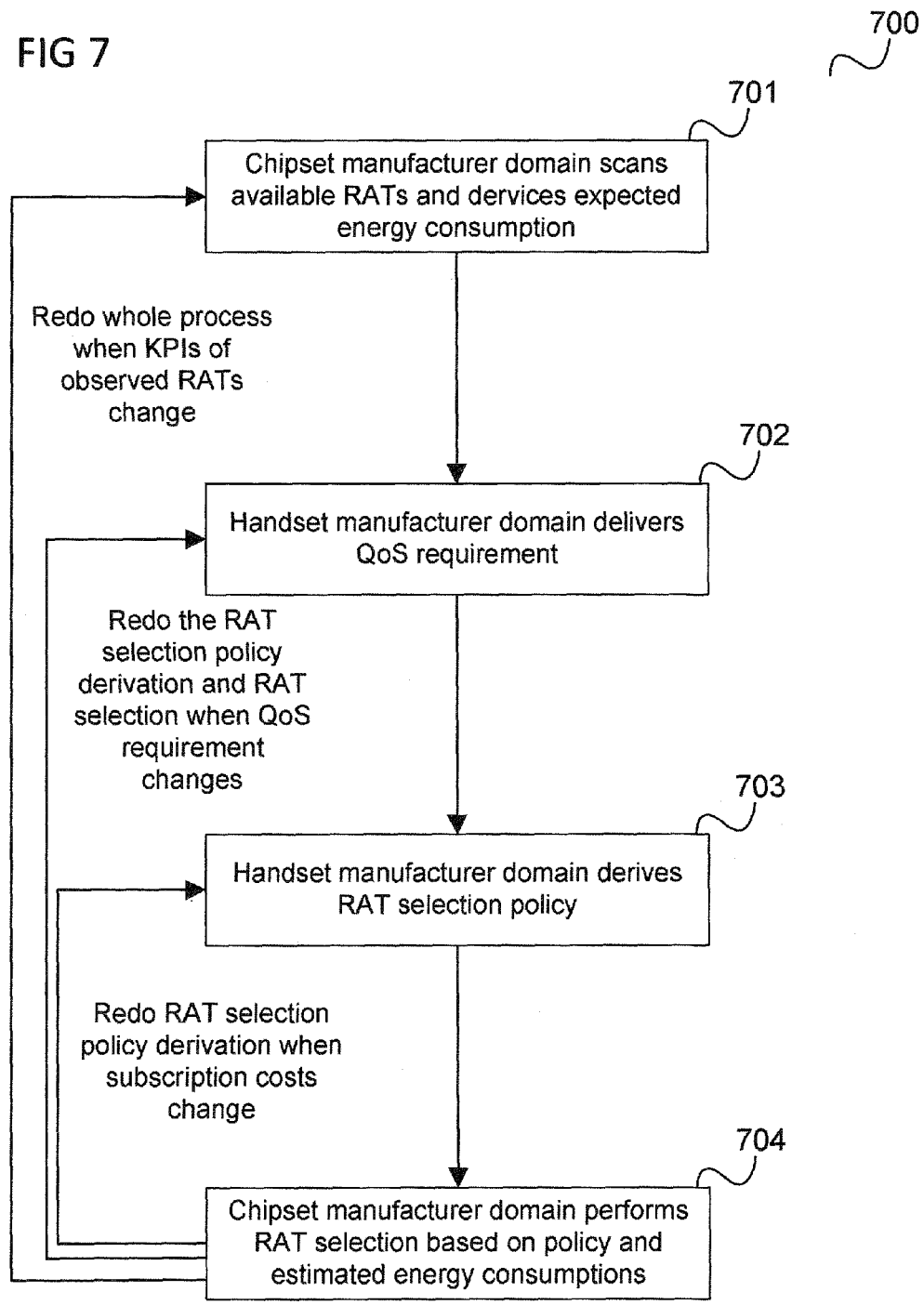
FIG. 7 shows a flow diagram illustrating a method for selecting a radio access technology or a combination of radio access technologies.

FIG. 7 shows a flow diagram 700 illustrating a method for selecting a radio access technology or a combination of radio access technologies.

In 701, the chipset manufacturer domain 608 acquires context information on available systems (i.e. RATs), for example by scanning, by reception of a information channel (e.g. the Cognitive Pilot Channel), etc., observes key performance indicators (such as SNR, RSSI, PER, etc.) and derives expected modem energy consumption (e.g. in Joules/bit i.e. in Joules per useful bit).

For example, during the chipset development time a number of energy consumption measurements are performed depending on KPIs, such as estimates of SNR, RSSI, Network load, PER, etc. For each configuration, a power consumption value, e.g. a Joules/useful bit value, i.e. a value specifying the required energy per useful (transmitted) bit for the radio condition as given by a combination KPIs is derived. The power consumption value may be an absolute value or a value corresponding to an integer multiple of a small pre-defined Joules/useful bit value.

Table 1 is an example of a pre-determined Joules/(useful) bit table given for each system state (or radio condition) as given by a combination of KPIs (SNR and network load in this example) and each RAT (WiFi, WiFi operating in TV white spaces, LTE in this example) an expected required power consumption for communicating using this RAT at a certain quality of service (QoS), in this example low, medium and high bitrate.

In order to reduce the complexity of the table, KPIs are classified into three categories: low, medium and high. For example, for SNR values three steps are considered: $(SNR)_{low}$, $(SNR)_{medium}$, $(SNR)_{high}$. It should be noted that any other granularity of discrete values may be used or a continuous value representation may be used. It should be noted that the values of the KPIs may depend on the RAT.

TABLE 1

Modem Power Consumption for operation of RATs depending on system state ("SS") in (Joules/bit) as for example derived based on measurements during communication device development process

| System State | Modem Power Consumption of Radio Access Technologies (RATs) in Mobile Device in (Joules/bit) | | | |
|---|---|---|---|---|
| | WiFi (IEEE 802.11a/b/g/n/ac, etc.) | WiFi TV White Spaces (IEEE 802.11af, etc.) | 3GPP LTE | ... |
| High SNR, low NW load, ... | Low bitrate: $A_{Low,SS1}$<br>Medium bitrate: $A_{Medium,SS1}$<br>High bitrate: $A_{High,SS1}$ | Low bitrate: $B_{Low,SS1}$<br>Medium bitrate: $B_{Medium,SS1}$<br>High bitrate: $B_{High,SS1}$ | Low bitrate: $C_{Low,SS1}$<br>Medium bitrate: $C_{Medium,SS1}$<br>High bitrate: $C_{High,SS1}$ | ... |
| High SNR, medium NW load, ... | Low bitrate: $A_{Low,SS2}$<br>Medium bitrate: $A_{Medium,SS2}$<br>High bitrate: $A_{High,SS2}$ | Low bitrate: $B_{Low,SS2}$<br>Medium bitrate: $B_{Medium,SS2}$<br>High bitrate: $B_{High,SS2}$ | Low bitrate: $C_{Low,SS2}$<br>Medium bitrate: $C_{Medium,SS2}$<br>High bitrate: $C_{High,SS2}$ | ... |
| High SNR, high NW load, ... | Low bitrate: $A_{Low,SS3}$<br>Medium bitrate: $A_{Medium,SS3}$<br>High bitrate: $A_{High,SS3}$ | Low bitrate: $B_{Low,SS3}$<br>Medium bitrate: $B_{Medium,SS3}$<br>High bitrate: $B_{High,SS3}$ | Low bitrate: $C_{Low,SS3}$<br>Medium bitrate: $C_{Medium,SS3}$<br>High bitrate: $C_{High,SS3}$ | ... |
| Medium SNR, low NW load, ... | Low bitrate: $A_{Low,SS4}$<br>Medium bitrate: $A_{Medium,SS4}$<br>High bitrate: $A_{High,SS4}$ | Low bitrate: $B_{Low,SS4}$<br>Medium bitrate: $B_{Medium,SS4}$<br>High bitrate: $B_{High,SS4}$ | Low bitrate: $C_{Low,SS4}$<br>Medium bitrate: $C_{Medium,SS4}$<br>High bitrate: $C_{High,SS4}$ | ... |
| Medium SNR, medium NW load, ... | Low bitrate: $A_{Low,SS5}$<br>Medium bitrate: $A_{Medium,SS5}$<br>High bitrate: $A_{High,SS5}$ | Low bitrate: $B_{Low,SS5}$<br>Medium bitrate: $B_{Medium,SS5}$<br>High bitrate: $B_{High,SS5}$ | Low bitrate: $C_{Low,SS5}$<br>Medium bitrate: $C_{Medium,SS5}$<br>High bitrate: $C_{High,SS5}$ | ... |
| ... | ... | ... | ... | |

For example, for LTE with high SNR and medium network load, to have medium bitrate, a power consumption of $B_{Medium,SS2}$ in Joules/bit can be expected.

For example, in 701 KPIs specifying the system state (or in other words the radio condition) for each RAT are observed by scanning the RAT or by any other means of information acquisition, e.g. through a Cognitive Pilot Channel, etc.

The power consumption table as for example table 1 enables the communication device 600 to determine an expected power consumption for each RAT for a desired transmission data rate (e.g. low bit rate, medium bit rate or high bit rate).

Since the power consumption of a RAT may depend on whether another RAT is operated simultaneously, the power consumption may for example be derived according to one of following approaches for a combination of RATs for the case that the communication device 600 operates multiple RATs simultaneously:

- The combined usage of RATs (e.g., WiFi and LTE) may be considered independently of the measurements for the individual RATs (as for example indicated in table 1) and the overall power consumption may be determined by independent measurements for the combination of RATs and included in the power consumption table.
- The combined usage of RATs may be assumed to lead to an overall power consumption corresponding to the sum of the individual power consumption values given for the individual RATs (as e.g. shown in table 1), weighted by a factor k which is for example a real valued scalar in the range between 0 and 1 and for example smaller than 1. For example, for a combination of WiFi and LTE, the expected power consumption may be estimated as (Joules/bit)$_{WiFi+LTE}$=k*[(Joule s/bit)$_{WiFi+LTE}$+(Joules/bit)$_{WiFi+LTE}$]. By using a factor k smaller than 1, hardware reuse benefits may be taken into account.

In 702, the handset manufacturer domain 613 indicates a QoS requirement, in this example in terms of a data rate requirement, such as low/medium/high data rate to the chipset manufacturer domain. The QoS requirement may also be a requirement regarding latency, connection reliability etc.

Based on the QoS requirement of the communication, the power consumption for each RAT (of all RATs that are possible candidates to be used for the communication) are derived based on the observed radio condition (as for example given by the KPIs) and the pre-determined values as given in the power consumption table (such as table 1).

In 703, the handset manufacturer domain (e.g. the LSPG 615) derives a RAT selection policy by prioritizing RAT and/or RAT combinations, for example by communication costs. Each RAT or RAT combination is linked with a maximum energy consumption indicator, i.e. with a maximum energy consumption up to which it is allowed to use the RAT or RAT combination. This policy (e.g. in the form of a preference list) is delivered to the chipset manufacturer domain 608, e.g. the ECE 615.

For example, based on the communication costs for the various RATs (e.g. the cost in Euros/Dollars/etc. to be paid to the operator of a given RAT Network, for example for a certain connection time or for a certain data amount), the handset manufacturer domain 613 (e.g. the LSPG 615) derives a preference list which gives a ranking of the RATs according to which the RAT to be used for communication should be selected, provided that the maximum allowed power consumption for this RAT is fulfilled. In other words, the RAT is to be selected for the communication which is the highest-ranked RAT in the preference list for which the estimated power consumption is at most equal to the maximum allowed power consumption for this RAT.

An example of a preference list is given in table 2.

TABLE 2

Depending on the communication costs, the handset manufacturer sets up a preference list for the RATs based on the current power consumption level.

| Index | RAT | Upper (Joules/Bit) limit |
|---|---|---|
| 1 | LTE | $V_{U,LTE}$ |
| 2 | 3G | $V_{U,3G}$ |
| 3 | 2G | $V_{U,2G}$ |

TABLE 2-continued

Depending on the communication costs, the handset manufacturer sets up a preference list for the RATs based on the current power consumption level.

| Index | RAT | Upper (Joules/Bit) limit |
|---|---|---|
| 4 | WiFi for TV White Spaces | $V_{U,WiFiTVWS}$ |
| ... | ... | ... |
| # | 3G & WiFi used simultaneously | $V_{U,3GWiFi}$ |
| ... | | |

The index in the first column of table 2 reflects the ranking of the RATs, i.e. the lower the index, the higher the RAT (or RAT combination) is ranked. The highest ranked RATs are the preferred ones for operation. As mentioned, the ranking may be derived based on costs. In the example of table 2, LTE communication may for example be less expensive than 3 G communication and therefore LTE is ranked higher than 3G.

The right column gives the energy consumption limit for the RATs, i.e. the maximum energy consumption up to which the RAT is allowed to be used. For example, LTE is only allowed to be used up to a power consumption of LTE communication of $V_{U,LTE}$. For example, above the maximum allowed energy consumption it may be too "painful" in terms of the energy required (e.g. because of a very high LTE network load) to use it, even if it may be the cheapest and for example, 3 G communication is to be selected although it is more expensive but has a lower power consumption. This may be seen as a trade-off between energy consumption and, for example, communication cost (as reflected in the ranking). Thus, the RAT that is selected based on the preference list is not necessarily the RAT which leads to the overall lowest power consumption. Rather, the preference list may take into account aspects like

- Reliability of a RAT (e.g. LTE may be preferred over WiFi, and thus be higher ranked that WiFi in the preference list, even if power consumption and communication costs are slightly higher compared to WiFi, since the Quality of Service is maintained more reliably). It should be noted that, if, for example WiFi becomes far more appealing in terms of power consumption and subscription cost than LTE, the handset manufacturer domain may indicated that WiFi should be selected over LTE (e.g. it should be switched from LTE to WiFi). This can happen by a preference list that is updated accordingly (e.g. ranking WiFi higher in the preference list based on the subscription cost but allowing a low maximum allowed power such that WiFi is only selected if the expected power consumption is low) or also by an explicit selection policy transmitted to the chipset manufacturer domain 608.
- Operator preferences (e.g. if a handset manufacturer builds mobile devices for a certain operator, specific RAT preferences of the operator may be included into the derivation of the RAT selection policy).
- The preferences may depend on the location of the mobile device, they may evolve over time and may thus be updated as required.

The preference list may for reasons of simplicity for example be generated based on a classification of the subscription cost (or cost per connection time or transmitted data amount) into three categories, e.g. low, medium, and high. This classification may be adapted to any number of classes.

The preference list represents the policy (or policies) for the RAT selection indicated to the chipset manufacturer domain 608 from the handset manufacturer domain 613.

Another example of a preference list is given in table 3.

TABLE 3

| Index | RAT to be used for target QoS/DataRate | Lower (Joules/Bit) limit | Upper (Joules/Bit) limit |
|---|---|---|---|
| 1 | LTE | 0 | $V_{U,LTE}$ |
| 2 | 3G | $V_{U,LTE}$ | $V_{U,3G}$ |
| 3 | 2G | $V_{U,3G}$ | $V_{U,2G}$ |
| 4 | WiFi for TV White Spaces | $V_{U,2G}$ | $V_{U,WiFiTVWS}$ |
| ... | ... | ... | ... |
| # | 3G & WiFi used simultaneously | $V_{U,...}$ | $V_{U,3GWiFi}$ |
| ... | | | |

In the example of table 3, it is assumed that the ranking is not based on costs but based on preferences of the network operator. For example, the network operator wants the users to use LTE such that up to a power consumption of $V_{U,LTE}$ the LTE should be chosen as RAT. From $V_{U,LTE}$ to $V_{U,3G}$ 3G should be chosen (it is in this example assumed for simplicity that the power consumption of 3G is actually higher than that of LTE and generally, that the power consumption of the RATs (or RAT combinations) increases from top to bottom in table 3). For example, the operator would prefer the users to use LTE but allows them to use 3G (which is for example cheaper for the users) if the LTE power consumption is getting so high that a forced usage of LTE can no longer be justified.

In 704, the chipset manufacturer domain 608, e.g. the ECE 616, performs RAT(s) link selection based on the RAT selection policy (as in this example given by the preference list) and according to the energy consumption estimates for the RATs.

For example, the preference list as illustrated in table 2 is transferred to the chipset manufacturer domain 608 (e.g. the ECE 616) via the multiradio access interface 614. Based on the estimated power consumption per RAT (e.g. derived from handset measurements of the system state KPIs based on table 1), the chipset manufacturer domain 608 (e.g. the ECE 616) chooses the first RAT or RAT combination (i.e. the one with the lowest index number) in the preference list which fulfills the power consumption requirements, i.e. for which the estimated power consumption is at most equal to the indicated maximum allowed power consumption.

For example, in the example for the preference list given by table 2, the communication device 600 first checks whether LTE fulfills the QoS (e.g. data rate) requirement at the indicated maximum modem power consumption budget (based on the measured KPIs). If the power consumption budget and the QoS requirement are met, LTE is chosen as a radio access technology for the communication. If not, a corresponding check is performed for 3G and then so on for 2G, WiFi for TV White Spaces, etc. until a suitable RAT or RAT combination is found.

The process may be restarted from 701 when the KPIs for the observed RATs (e.g. for any one of the candidate RATs) change. For example, the expected energy consumption may be re-determined for a RAT when the KPIs change for the RAT and it may be determined whether the previous RAT selection is valid or should be changed in view of the changed KPIs (and possibly changed expected energy consumption).

The process may return to 702 for a QoS requirement change and the RAT selection policy derivation and the RAT selection (i.e. 703 and 704) may be redone in this case.

The RAT selection policy derivation (i.e. 703) may be redone when subscription costs change.

It should be noted that in the RAT selection process illustrated in FIG. 7, the main RAT selection is handled within the chipset manufacturer domain 608 which can be seen to receive (high-level) instructions from the handset manufacturer domain 613, such as policies (specifically a preference list in the above example) related to RAT selection. Alternatively, most or all of the actual RAT selection may be carried out in the handset manufacturer domain 613, while the chipset manufacturer domain 608 delivers required metrics (including the energy consumption indications related to the current system state information) to the handset manufacturer domain 616 via the multiradio access interface 614. For example, such a (simplified) metric may indicate for a RAT that it has "good performance" or "low power consumption". It may thus for example be avoided that the handset manufacturer domain 613 gets access to the power consumption values (as for example given in table 1) since this may be undesirable by the chipset manufacturer.

In other words, in the link (or RAT) selection approach shared between the chipset manufacturer domain 608 and the handset manufacturer domain 613, the tasks carried out by the two domains 608, 613 may be divided in various ways between the two domains 608, 613. For example, the chipset manufacturer domain 608 may provide the information about the energy consumption of the various RATs and the handset manufacturer domain 613 selects a RAT based on the energy consumptions (and for example a preference list as described above) and sends an explicit RAT selection command to the chipset manufacturer domain 608 specifying which RAT is to be selected for the communication.

Further, even if a RAT selection process is provided in the chipset manufacturer domain 608, e.g. based on a preference list as described above, there may be the option that the handset manufacturer domain 613 can overrule this process by an explicit RAT selection command For example, the handset manufacturer domain 613 may enforce the usage of a home base station (e.g. a femto cell) of the user when the user is at home (as for example detected by usage of a positioning system such as GPS). Generally, there may be rules or commands which take priority over the preference list. For example, the handset manufacturer domain 613 may communicate "hard" RAT selection policies to the chipset manufacturer domain 608 (such as the instruction to select a specific RAT) and "soft" RAT selection policies such as a preference list. It should be noted that when the chipset manufacturer domain 608 has selected the RAT (or RAT combination) to be used, this may be communicated back to the handset manufacturer domain 613, for example to allow the user to be informed about the selected RAT on the display 208 of the communication device 200 or such that software running on the application processor (e.g. CPU 202) can derive which services are available.

It should further be noted that the RAT selection policy (or policies) such as a preference list are not necessarily given by a network operator, e.g. an operator of a home network of the communication device (i.e. the operator of the communication network to which the user of the communication device has subscribed) but may also at least partially be defined by the user of the communication device.

According to one aspect of this disclosure, an issue is addressed which typically may be a major concern of a communication network operator. For example in case of the RAT selection process described above with reference to FIG. 7, if the radio conditions (e.g. in terms of the KPIs change quickly), the case may arise that according to the RAT selection process, the communication device 600 constantly switches between two (or more RATs) at a high pace. This is referred to as "ping-pong" effect and is illustrated in FIG. 8.

Figure 8:
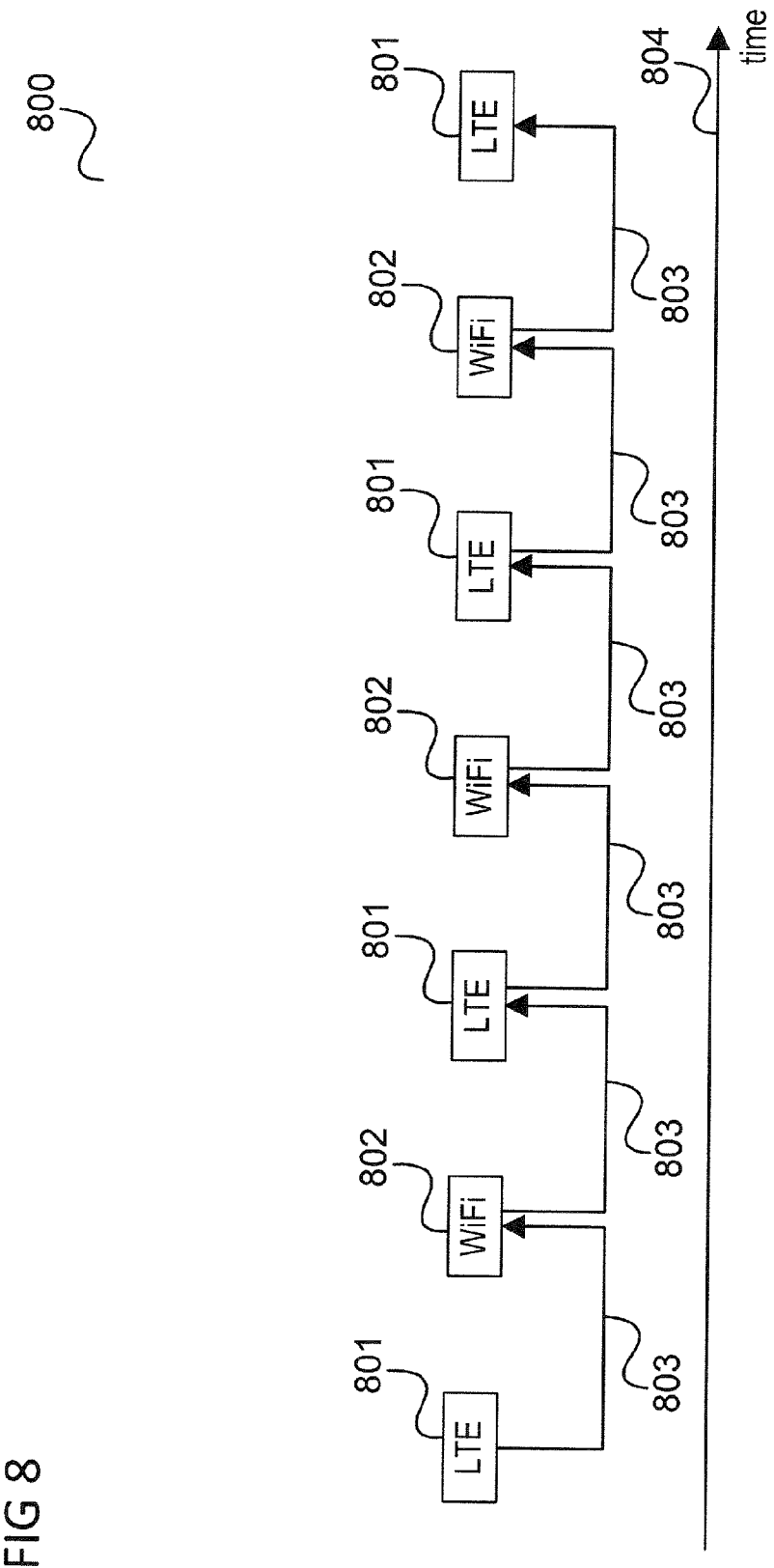
FIG. 8 shows a state diagram illustrating switching between radio access technologies.

FIG. 8 shows a state diagram 800 illustrating switching between radio access technologies.

In this example, the communication device 600 rapidly switches back and forth between a first state 801 in which LTE is used as RAT for communication and a state 802 in which WiFi is used as RAT for communication (as illustrated by arrows 803 and assuming that time runs from left to right along a time axis 804).

Such a behavior of the communication device 600 is typically bad for the overall system performance and should therefore typically be avoided. According to one aspect of this disclosure, this is addressed by a communication device as illustrated in FIG. 9.

Figure 9:
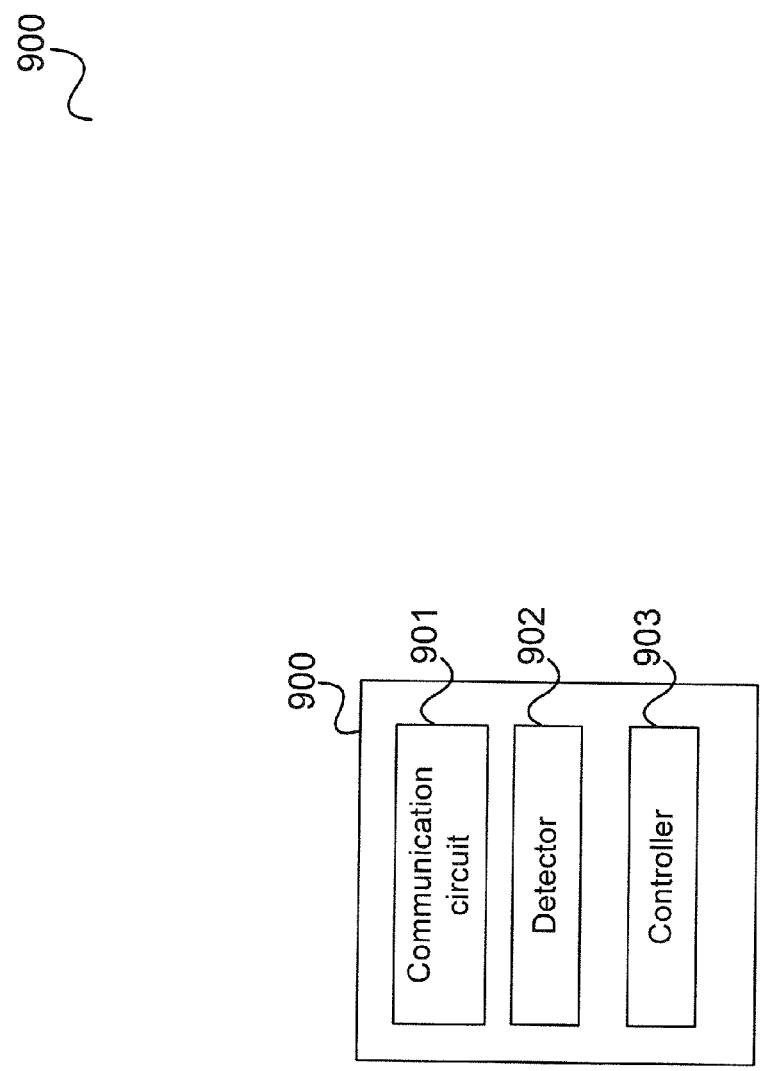
FIG. 9 shows a communication device including components for selecting a radio access technology.

FIG. 9 shows a communication device 900 including components for selecting a radio access technology.

The communication device 900 includes a communication circuit 901 configured to communicate using a radio access technology.

The communication device 900 further includes a detector 902 configured to detect whether a predetermined waiting time has elapsed since the time of a switch (by the communication circuit) between communicating using the radio access technology and not communicating using the radio access technology.

The communication device 900 further includes a controller 903 configured to control the communication circuit to switch between communicating using the radio access technology and not communicating using the radio access technology depending on whether it has been determined that the predetermined waiting time has elapsed since the time of the switch between communicating using the radio access technology and not communicating using the radio access technology.

According to one aspect of this disclosure, in other words, a "ping-pong" behavior regarding RAT selection is avoided by introducing a mandatory waiting time between using a RAT and not using a RAT. For example, the switch between communicating using the radio access technology and not communicating using the radio access technology is a switch between the communication circuit communicating using the radio access technology and the communication circuit using another radio access technology. The communication circuit may for example be configured to communicate using one or more of a plurality of radio access technologies including the radio access technology. In other words, the communication circuit may support more than one radio access technologies (and may support simultaneous operation of one or more radio access technologies). The waiting time is for example increased after each switch and is re-set to an original (or initial value) as soon as the system remains stable (i.e. communicating using the RAT is not started or stopped) for a predetermined time duration.

The detector is for example configured to detect whether a predetermined waiting time has elapsed since the time of the switch between communicating using the radio access technology and not communicating using the radio access technology in response to an event triggering the switch between communicating using the radio access technology to not communicating using the radio access technology. For example, it may be determined based on changed radio conditions (leading for example to an changed energy consumption) that there should be a switch from the radio access technology to another radio access technology or from the other radio access technology to the radio access technology and for example in this case, it is detected whether the waiting time has elapsed and only if the waiting time has elapsed, a switch between the radio access technology and the other radio access technology is made. In other words, for example, the detector and the controller perform the detecting and controlling described above in response to the event that a radio access technology switching criterion is fulfilled (which would for example trigger a switch to communicating using the radio access technology or a switch to not communicating using the radio access technology but, for example, using another radio access technology).

It should be noted that a switch to communicating using the radio access technology may be a switch to communicating using a set of radio access technologies including the radio access technology.

The event is for example the reception of an instruction to the communication circuit to switch from communicating using the radio access technology to communicating using another radio access technology or to switch from communicating using the other radio access technology to communicating using the radio access technology.

It should be noted that a switch to communicating using the other radio access technology may be a switch to communicating using a set of radio access technologies not including the radio access technology.

The time of the switch to communicating using the radio access technology or not communicating using the radio access technology is for example the time of the most recent switch between communicating using the radio access technology and not communicating using the radio access technology.

The communication device may further include a memory storing the predetermined waiting time.

The controller may be further configured to generate the predetermined waiting time from an initial waiting time by increasing the initial waiting time in response to the switch between communicating using the radio access technology and not communicating using the radio access technology.

The controller is for example further configured to increase the predetermined waiting time if a switch between communicating using the radio access technology and not communicating using the radio access technology is performed.

For example, the controller is configured to increase the predetermined waiting time with each of a plurality of consecutive switches between communicating using the radio access technology and not communicating using the radio access technology.

The controller is for example configured to increase the amount of time by which the predetermined waiting time is increased, wherein the controller is configured to increase the amount of time with each of the plurality of consecutive switches between communicating using the radio access technology and not communicating using the radio access technology.

The controller is for example configured to set the predetermined waiting time to an initial waiting time after a predetermined duration without switch between communicating using the radio access technology and not communicating using the radio access technology.

According to one aspect of this disclosure, the control circuit is configured to control the communication circuit to switch between communicating using the radio access technology and not communicating using the radio access technology if (e.g. only if) it has been determined that the waiting time has elapsed since the time of the switch between communicating using the radio access technology and not communicating using the radio access technology.

The control circuit is for example configured to control the communication circuit not to switch between communicating using the radio access technology and not communicating using the radio access technology if it has been determined that the waiting time has not elapsed since the time of the switch between communicating using the radio access technology and not communicating using the radio access technology.

The switch between communicating using the radio access technology and not communicating using the access technology is for example a start of communicating using the radio access technology or a stop of communicating using the radio access technology.

Figure 10:
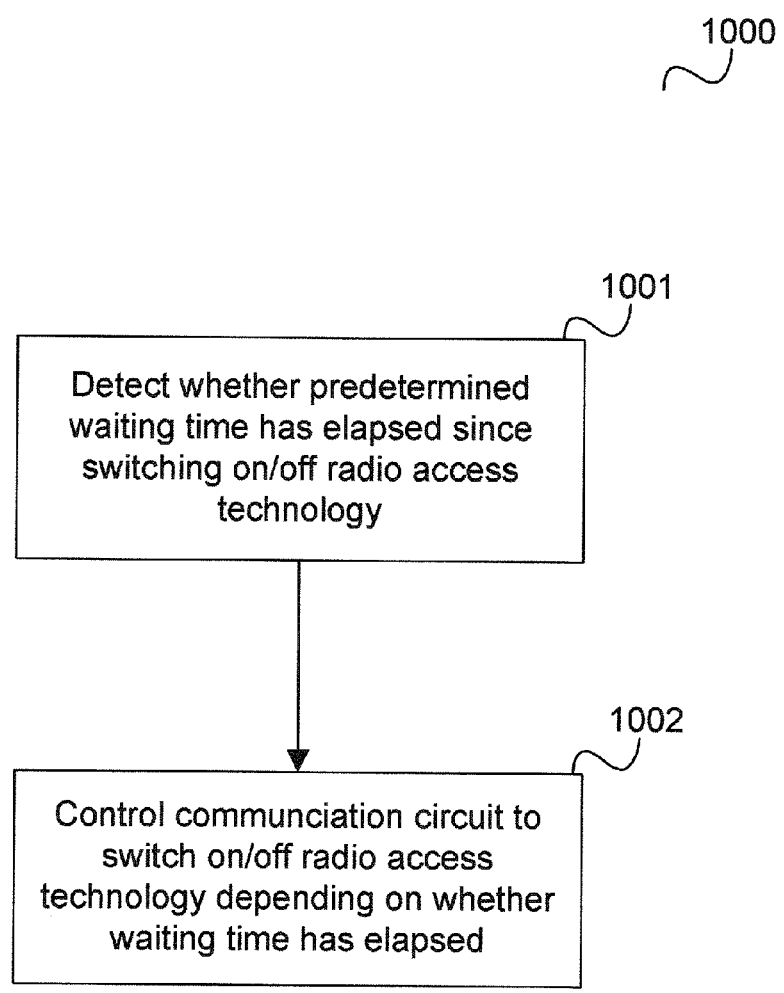
FIG. 10 shows a flow diagram illustrating a method for selecting a radio access technology.

The communication device 900 for example carries out a method as illustrated in FIG. 10.

FIG. 10 shows a flow diagram 1000 illustrating a method for selecting a radio access technology.

The flow diagram 1000 illustrates a method for selecting a radio access technology.

In 1001, it is detected whether a predetermined waiting time has elapsed since the time of a switch between communicating using the radio access technology and not communicating using the radio access technology.

In 1002, the communication circuit is controlled to switch between communicating using the radio access technology and not communicating using the radio access technology depending on whether it has been determined that the predetermined waiting time has elapsed since the time of the switch between communicating using the radio access technology and not communicating using the radio access technology.

It should be noted that aspects described in context of one of the communication devices described with reference to FIGS. 4 and 9 are analogously valid for the other communication device and for the methods for selecting a radio access technology and vice versa.

The various components of the communication devices (e.g. detector, controller and determiner) may be implemented by means of one or more circuits. A "circuit" may be understood as any kind of a logic implementing entity, which may be special purpose circuitry or a processor executing software stored in a memory, firmware, or any combination thereof. Thus, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit".

Figure 11:
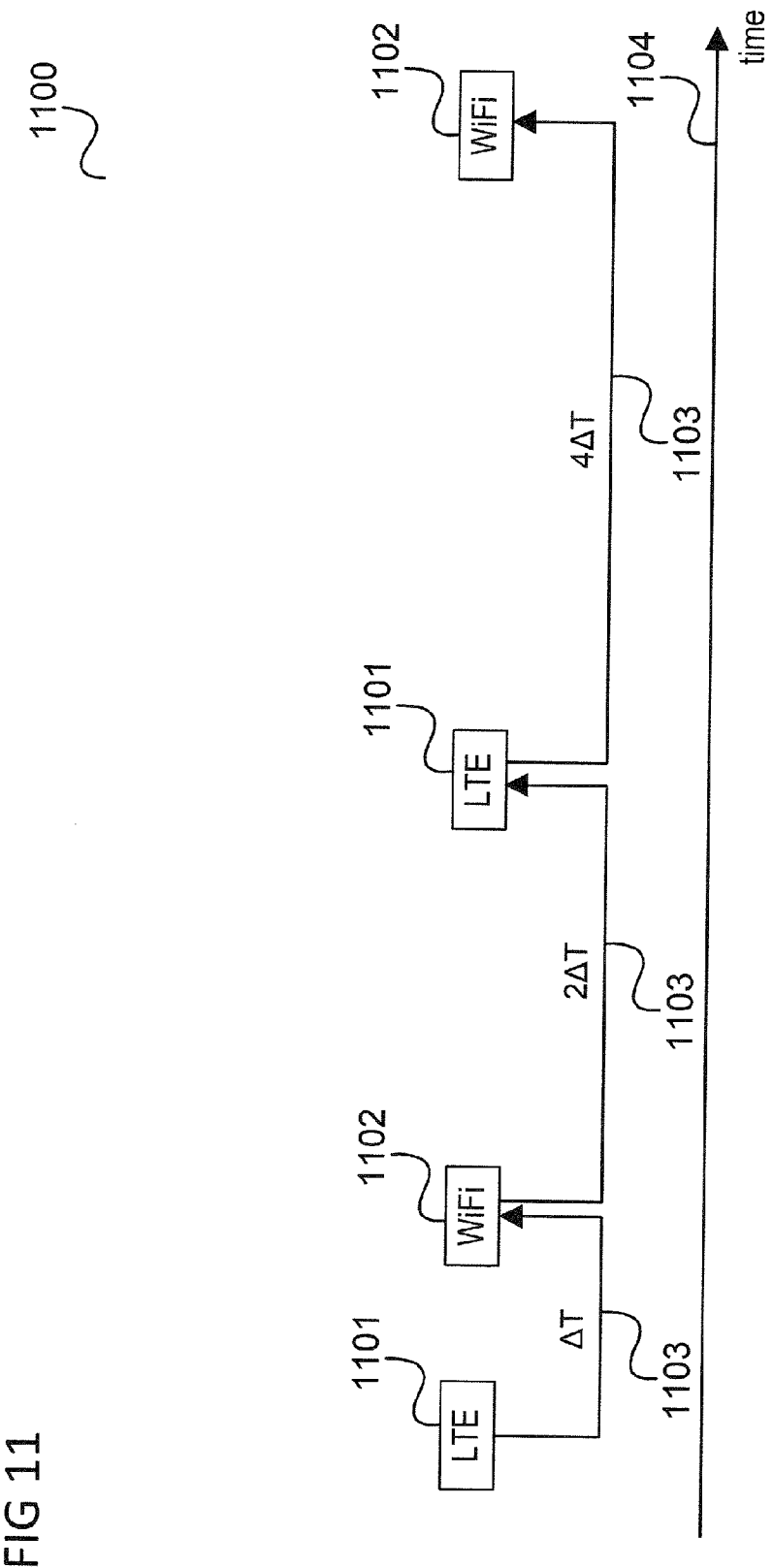
FIG. 11 shows a state diagram illustrating switching between radio access technologies.

An example where the mandatory waiting time is doubled after each RAT reselection process (i.e. each RAT switching event) is illustrated in FIG. 11.

FIG. 11 shows a state diagram 1100 illustrating switching between radio access technologies.

Similarly to the example shown in FIG. 8, the communication device switches between in first state 1101 in which LTE is used as RAT and a second state 1102 in which WiFi is used as RAT. However, the waiting time between two switching events (as illustrated by arrows 1104) increases from an initial value $\Delta T$, to $2\Delta T$, $4\Delta T$, $8\Delta T$, $16\Delta T$, ... $2^n \Delta T$ with "n" being the iteration number from switching event to switching event. Thus, in this example, the waiting time increases exponentially.

For example, after a predetermined time without switching event, the waiting time is reset to the initial value $\Delta T$.

While the invention has been particularly shown and described with reference to specific aspects, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device comprising:
    a determiner configured to determine, for each of a plurality of radio access modes, an expected power consumption required for communicating using the radio access mode; and
    a controller configured to select a radio access mode from the plurality of radio access modes as candidate radio access mode to be used for communication based on the determined expected power consumptions,
    wherein the controller is further configured to select a radio access mode as the candidate radio access mode depending on whether the power consumption determined for the radio access mode is within a maximum allowed power consumption.

2. The communication device of claim 1, wherein each of the plurality of radio access modes corresponds to a radio access technology (RAT) or a combination of radio access technologies and wherein using the candidate radio access mode to be used is a radio access technology or a combination of radio access technologies.

3. The communication device of claim 1, wherein the determiner is further configured to determine, for each of the plurality of radio access modes, a radio condition for communicating using the radio access mode and is configured to determine the expected power consumption for the radio access mode based on the radio condition determined for the radio access mode.

4. The communication device of claim 3, wherein the radio condition for a radio access mode is the load of a communication network that would be used for the radio access mode or a reception quality of one or more signals received using the radio access mode.

5. The communication device of claim 1, wherein the controller is further configured to control the communication device to communicate using the selected candidate radio access mode.

6. The communication device of claim 1, wherein the controller is configured to select the candidate radio access mode further based on a data rate desired for the communication.

7. The communication device of claim 1, wherein the controller is configured to select the candidate radio access mode further based on a radio access technology (RAT) selection policy.

8. The communication device of claim 1, wherein the controller is configured to generate a ranking of the radio access modes based on the determined expected power consumptions and is configured to select a radio access mode to be used for communication based on the ranking of radio access modes.

9. The communication device of claim 1, wherein the controller is configured to receive a preference list specifying a ranking of the plurality of radio access modes and is configured to select the candidate radio access mode to be used for communication based on the ranking.

10. The communication device of claim 1, wherein the controller is configured to generate a first ranking of the radio access modes based on the determined expected power consumptions and is configured to receive a preference list specifying a second ranking of the plurality of radio access modes and is configured to select a radio access mode to be used for communication based on a combination of the first ranking of radio access modes and the second ranking of radio access modes.

11. The communication device of claim 9, wherein the preference list further specifies for each radio access mode of the plurality of radio access modes the maximum allowed power consumption.

12. The communication device of claim 11, wherein the controller is configured to select a radio access mode as candidate radio access mode only if the power consumption estimated for the radio access mode is within the allowed power consumption.

13. The communication device of claim 9, wherein the controller is part of the chipset manufacturer domain of the communication device and is configured to receive the preference list from a component of the handset manufacturer domain of the communication device.

14. The communication device of claim 13, further comprising a policy manager as the component of the handset manufacturer domain of the communication device, wherein the policy manager is configured to generate the preference list.

15. A method for selecting a radio access mode comprising:
    determining, for each of a plurality of radio access modes, an expected power consumption required for communicating using the radio access mode; and
    selecting a radio access mode from the plurality of radio access modes as a candidate radio access mode to be used for communication based on the determined expected power consumptions,
    wherein a radio access mode is selected the candidate radio access mode depending on whether the power consumption determined for the radio access mode is within a maximum allowed power consumption.

16. The method of claim 15, wherein each radio access mode corresponds to a radio access technology or a combination of radio access technologies and using the radio access mode for communication is using the radio access technology or the combination of radio access technologies for communication.

17. The method of claim 16, further comprising determining, for each of the plurality of radio access modes, a radio condition for communicating using the radio access mode and determining the expected power consumption for the radio access mode based on the radio condition determined for the radio access mode.

18. The method of claim 17 wherein the radio condition for a radio access mode is the load of a communication network that would be used for the radio access mode or a reception quality of one or more signals received using the radio access mode.

19. The method of claim 15, wherein the controller is further configured to control the communication device to communicate using the selected candidate radio access mode.

20. The method of claim 15, wherein the candidate radio access mode is selected further based on a data rate desired for the communication.

21. The method of claim 15, wherein the candidate radio access mode is selected further based on a RA. T selection policy.

22. A communication device comprising:
    a communication circuit configured to communicate using a radio access technology;
    a detector configured to detect whether a predetermined waiting time has elapsed since the time of a switch between communicating using the radio access technology and not communicating using the radio access technology;
    a controller configured to control the communication circuit to switch between communicating using the radio access technology and not communicating using the radio access technology depending on whether the predetermined waiting time has elapsed since the time of the switch.

23. The communication device according to claim 22, wherein the detector is configured to detect whether a predetermined waiting time has elapsed since the switch between communicating using the radio access technology and not communicating using the radio access technology in response to an event triggering the switch between communicating using the radio access technology and not communicating using the radio access technology.

24. The communication device according to claim 23, wherein the event is the reception of an instruction to the communication circuit to switch from communicating using the radio access technology to communicating using another radio access technology or to switch from communicating using the other radio access technology to communicating using the radio access technology.

25. The communication device according to claim 22, wherein the time of the switch between communicating using the radio access technology and not communicating using the radio access technology is the time of the most recent switch between communicating using the radio access technology and not communicating using the radio access technology.

26. The communication device according to claim 22, further comprising a memory storing the predetermined waiting time.

27. The communication device according to claim 22, wherein the controller is further configured to generate the predetermined waiting time from an initial waiting time by increasing the initial waiting time in response to the switch between communicating using the radio access technology and not communicating using the radio access technology.

28. The communication device according to claim 22, wherein the controller is further configured to increase the predetermined waiting time, if a switch between communicating using the radio access technology and not communicating using the radio access technology is performed.

29. The communication device according to claim 28, wherein the controller is configured to increase the predetermined waiting time with each of a plurality of consecutive switches between communicating using the radio access technology and not communicating using the radio access technology.

30. The communication device according to claim 29, wherein the controller is configured to increase the amount of time by which the predetermined waiting time is increased, wherein the controller is configured to increase the amount of time with each of the plurality of consecutive switches between communicating using the radio access technology and not communicating using the radio access technology.

31. The communication device according to claim 28, wherein the controller is configured to set the predetermined waiting time to an initial waiting time after a predetermined duration without switch between communicating using the radio access technology and not communicating using the radio access technology.

32. The communication device according to claim 22, wherein the control circuit is configured to control the communication circuit to switch between communicating using the radio access technology and not communicating using the radio access technology if the waiting time has elapsed since the time of the switch.

33. The communication device according to claim 22, wherein the control circuit is configured to control the communication circuit not to switch between communicating using the radio access technology and not communicating using the radio access technology if the waiting time has not elapsed since the time of the switch.

34. The communication device according to claim 22, wherein the switch between communicating using the radio access technology and not communicating using the access technology is a start of communicating using the radio access technology or a stop of communicating using the radio access technology.

35. A method for selecting a radio access technology comprising:
- detecting whether a predetermined waiting time has elapsed since the time of a switch between communicating using a radio access technology and not communicating using the radio access technology;
- controlling the communication circuit to switch between communicating using the radio access technology and not communicating using the radio access technology depending on whether the predetermined waiting time has elapsed since the time of the switch.

* * * * *

UNITED STATES PATENT AND TRADEMARK OFFICE
CERTIFICATE OF CORRECTION

Page 1 of 1

PATENT NO. : 8,855,709 B2
APPLICATION NO. : 13/463854
DATED : October 7, 2014
INVENTOR(S) : Markus Dominic Mueck It is certified that error appears in the above-identified patent and that said Letters Patent is hereby corrected as shown below:

In the claims

Column 21, line 63 (Claim 21): Replace "RA. T" with --RAT--.

Signed and Sealed this
Twenty-ninth Day of March, 2016

Michelle K. Lee
*Director of the United States Patent and Trademark Office*